(12) United States Patent
Sethia

(10) Patent No.: US 12,321,936 B2
(45) Date of Patent: Jun. 3, 2025

(54) DECENTRALIZED PLATFORM APPLICATION PROGRAMMING INTERFACE PROTOCOL FOR SECURE RESOURCE TRANSMISSIONS

(71) Applicant: BANK OF AMERICA CORPORATION, Charlotte, NC (US)

(72) Inventor: Maneesh Sethia, Telangana (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 104 days.

(21) Appl. No.: 18/135,268

(22) Filed: Apr. 17, 2023

(65) Prior Publication Data

US 2024/0346497 A1 Oct. 17, 2024

(51) Int. Cl.
*G06Q 20/40* (2012.01)
*G06F 9/54* (2006.01)

(52) U.S. Cl.
CPC .......... *G06Q 20/401* (2013.01); *G06F 9/547* (2013.01)

(58) Field of Classification Search
None
See application file for complete search history.

(56) References Cited

U.S. PATENT DOCUMENTS

| | | | | |
|---|---|---|---|---|
| 10,726,002 | B1* | 7/2020 | Srivastava | G06F 16/28 |
| 11,075,891 | B1* | 7/2021 | Long | H04L 9/3213 |
| 11,321,758 | B1* | 5/2022 | Kwatra | G06Q 30/0639 |
| 11,367,060 | B1* | 6/2022 | Barbashin | H04N 21/2743 |
| 11,501,297 | B1* | 11/2022 | Tai | G06Q 20/20 |
| 11,811,944 | B2* | 11/2023 | Agrawal | G06N 20/00 |
| 2011/0099185 | A1* | 4/2011 | Trevor | G06F 16/95 707/E17.108 |
| 2014/0245281 | A1* | 8/2014 | Lee | G06F 8/61 717/171 |

(Continued)

FOREIGN PATENT DOCUMENTS

| | | | | |
|---|---|---|---|---|
| EP | 4366228 A1 * | 5/2024 | | H04L 9/002 |
| WO | WO-2023039344 A1 * | 3/2023 | | G06F 16/955 |
| WO | WO-2023200840 A1 * | 10/2023 | | G06Q 20/02 |

*Primary Examiner* — Neha Patel
*Assistant Examiner* — Jahed Ali
(74) *Attorney, Agent, or Firm* — Moore & Van Allen PLLC; Nicholas C. Russell

(57) ABSTRACT

Embodiments of the invention are directed to systems, methods, and computer program products for a decentralized platform application programming interface protocol for secure resource transmissions. The invention provides a decentralized platform application programming interface protocol for secure resource transmission and tracing. The invention provides an authentication feature complied into a data JSON packet and embedded into a code configured non-fungible token (NFT) that is then transmitted to a user with a prompt command to open an encrypted URL associated with the NFT. Upon accessing the encrypted URL, the system triggers the sender to a decentralized platform application programming interface allowing for communication across the decentralized platform application programming interface to validate the data packets between each other for authentication and authorization. The system further stores the NFT generation and deployment on a distributed ledger. In this way, storing and tracking the movement of resources using a distributed ledger.

15 Claims, 8 Drawing Sheets

(56) References Cited

U.S. PATENT DOCUMENTS

| | | | |
|---|---|---|---|
| 2020/0005284 A1* | 1/2020 | Vijayan | G06Q 20/065 |
| 2020/0259673 A1* | 8/2020 | Aono | H04L 12/1827 |
| 2020/0273048 A1* | 8/2020 | Andon | G06Q 10/02 |
| 2020/0356722 A1* | 11/2020 | Mano | H04L 12/1822 |
| 2021/0357489 A1 | 11/2021 | Tali | |
| 2022/0300954 A1* | 9/2022 | Paler | G06Q 20/123 |
| 2022/0376919 A1 | 11/2022 | Goshon | |
| 2023/0043095 A1* | 2/2023 | Milam | H04L 9/3247 |
| 2023/0119641 A1* | 4/2023 | Meyers | A63F 13/69 |
| | | | 463/42 |
| 2023/0138023 A1* | 5/2023 | Yang | A63F 13/86 |
| | | | 463/42 |
| 2023/0198760 A1* | 6/2023 | Ferenczi | H04L 9/3247 |
| | | | 713/168 |
| 2023/0259924 A1* | 8/2023 | Zamora | G06Q 20/223 |
| | | | 705/64 |
| 2023/0283488 A1* | 9/2023 | Srivastava | H04L 63/123 |
| | | | 726/1 |
| 2023/0388132 A1* | 11/2023 | Thacker | G06F 16/27 |
| 2024/0005309 A1* | 1/2024 | Osborn | G06Q 20/065 |
| 2024/0152912 A1* | 5/2024 | Andral | G06Q 20/1235 |
| 2024/0232858 A1* | 7/2024 | Tax | G06Q 20/3829 |

* cited by examiner

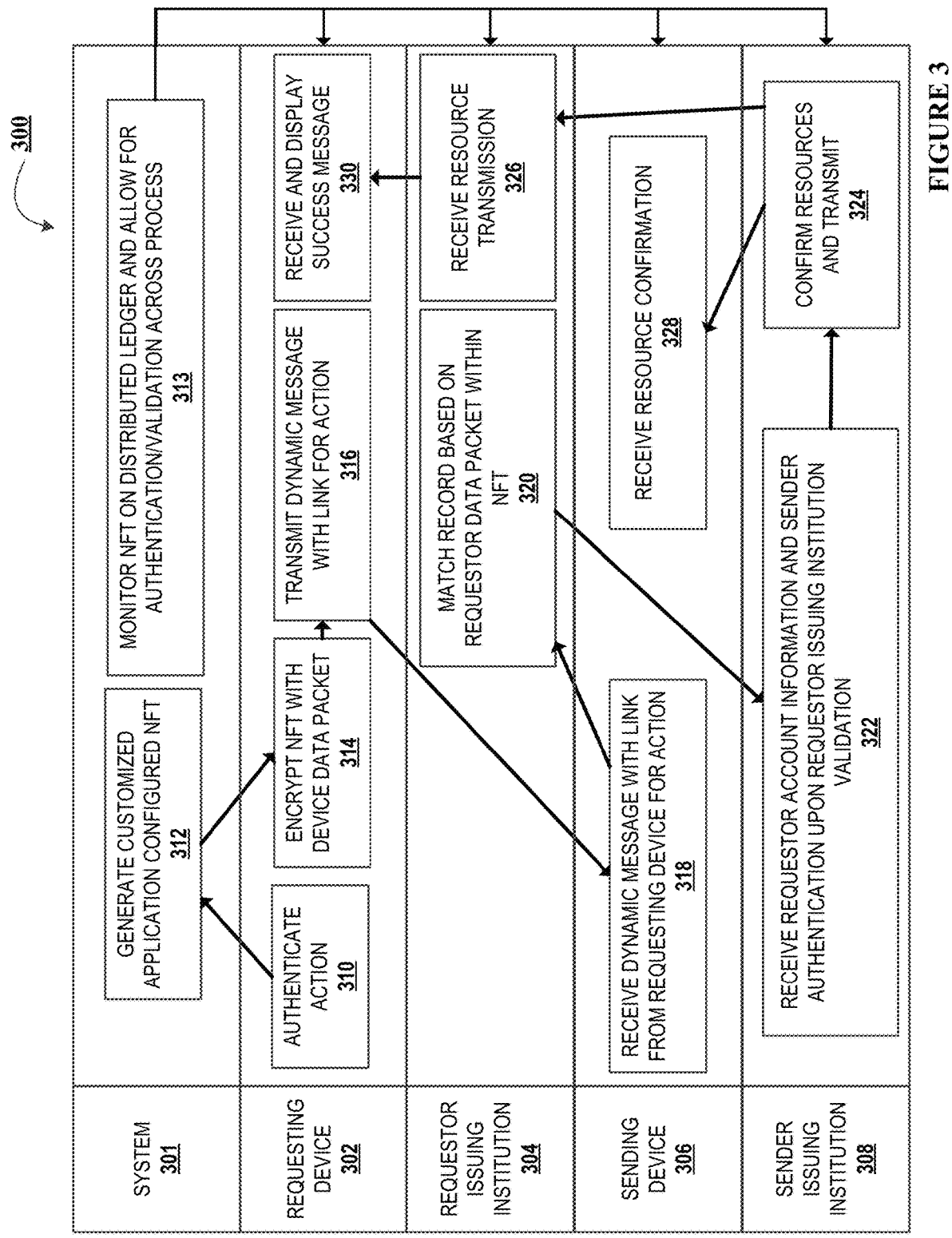

DECENTRALIZED PLATFORM APPLICATION PROGRAMMING INTERFACE PROTOCOL FOR SECURE RESOURCE TRANSMISSIONS

BACKGROUND

As technology advances, secure resource transmissions and tracing of resource accounts require exact inputs. Within the current environment security lapses and transmission errors in resource transmissions causes delays and improper resource transmissions that are irreversible. As such a need exists for a decentralized platform for secure resource transmissions.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the invention are directed to systems, methods, and computer program products for a decentralized platform application programming interface protocol for secure resource transmissions. The invention provides a decentralized platform application programming interface protocol for secure resource transmission and tracing. The system may utilize a secure user device to request resource transmissions and resource tracing.

The user device identifies an authentication feature associated with the user upon receiving a request from a requestor for a resource transmission from a sender. This authentication feature along with a time stamp, user device geolocation, static user device identification, and resource account information will be complied into a data JSON packet and embedded into a code configured non-fungible token (NFT). In this way, the data packet may be a customized application configured NFT data packet JSON. The NFT is then transmitted to the sender with a prompt command to open an encrypted URL associated with the NFT.

Upon accessing the encrypted URL, the system triggers the sender to a decentralized platform application programming interface, such as a decentralized finance open banking application programming interface. Upon opening at the sender user device, the data packet may be redirected to the requestor's financial institution for authentication and authorization of the request to match the record of the data packet parameters. Upon opening at the sender user device the data packet is also redirected to the sender's financial institution to confirm resources and account information for performing the digital resource transmission. The requestor and sender financial institutions may communicate across the decentralized platform application programming interface to validate the data packets between each other for authentication and authorization. The sender's financial institution may utilize the decentralized platform application programming interface to send the requested amount to the requestor's financial institution and close the transaction. Utilizing the decentralizing platform application programming interface allows for secure communication between financial institutions to streamline and share information across the platform without requiring additional user authentication at one or more separate financial institutions.

In conjunction, the sender financial institution confirms account information and approves the secure resource transmission. The system further stores the NFT generation and deployment on a distributed ledger. In this way, storing and tracking the movement of resources.

Today, resource transmissions across geographic locations, such as a wire transfer, digital transfer, or the like, typically requires several steps to initiate, including providing information for both the user and the recipient, including but not limited to account numbers, address, routing numbers, swift code, or the like. A single error in the inputs will trigger a misappropriation of the transmission, which could include a delay of the resource transmission, denial of resource transmission, or misplacement of resource transmission especially across international secure resource transmissions.

Furthermore, in today's world it's difficult to trace the origin of the resource distributions such as resource transaction across the global to prevent misappropriation. The currency transaction patterns of an entity or user is identified to identify inconsistency outside of normal activities. This may include a volume of cashier's checks, money orders, and/or wire transfers deposited into or purchased through an account when the nature of the account holder's normal activity would not appear to justify such activity.

The system generates a dynamically configured custom NFT for every transaction from an account and tag the same within a distributed ledger. The NFT would be irreversible and will track the transaction throughout the lifetime of the resource distribution. The system uses the decentralized platform application programming interface protocol techniques to crawl through the resource distributions to identify resource transactions associated with misappropriation steps.

Embodiments of the invention relate to systems, methods, and computer program products for decentralizing a platform application programming interface protocol, the invention comprising: receiving an authentication action triggered from a requesting device; compiling requesting action, authentication feature, and resource data; creating a JSON data packet comprising the requesting action, the authentication feature, the resource data, and an encrypted uniform resource locator (URL); embedding the JSON data packet into a configured non-fungible token (NFT); transmitting the configured NFT; generating, upon encrypted URL access, a linkage to a decentralized platform application programming interface; and performing action for account tracing or resource distribution based on smart contract embedded with the JSON data packet.

In some embodiments, the requesting action comprises requesting a digital resource transfer from a sender to a requestor. The JSON data packet further comprises smart contact directions for generating a resource transfer, wherein the JSON data packet redirects data to a sender and a requestor financial institution for authentication and authorization of the requesting action, wherein upon matching of a record of data packet parameters perform a digital resource transmission.

In some embodiments, the requesting action comprises tracking resource distributions from a resource distribution account. The JSON data packet further comprises smart contact directions for tracing a digital resource account by building a distributed ledger of all transactions associated with an NFT tagged resource account, building a pattern of resource distributions associated with the digital resource account.

In some embodiments, the authentication feature further comprises a feature of the requestor taken by the requesting device.

In some embodiments, the decentralized platform application programming interface performs secure communication between financial institutions to transmit data across the decentralized platform application programming interface without requiring additional user authentication at one or more separate financial institutions.

In some embodiments, the invention further comprises a distributed ledger storing the configured NFT.

In some embodiments, the requesting device further comprises internet enabled glasses.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
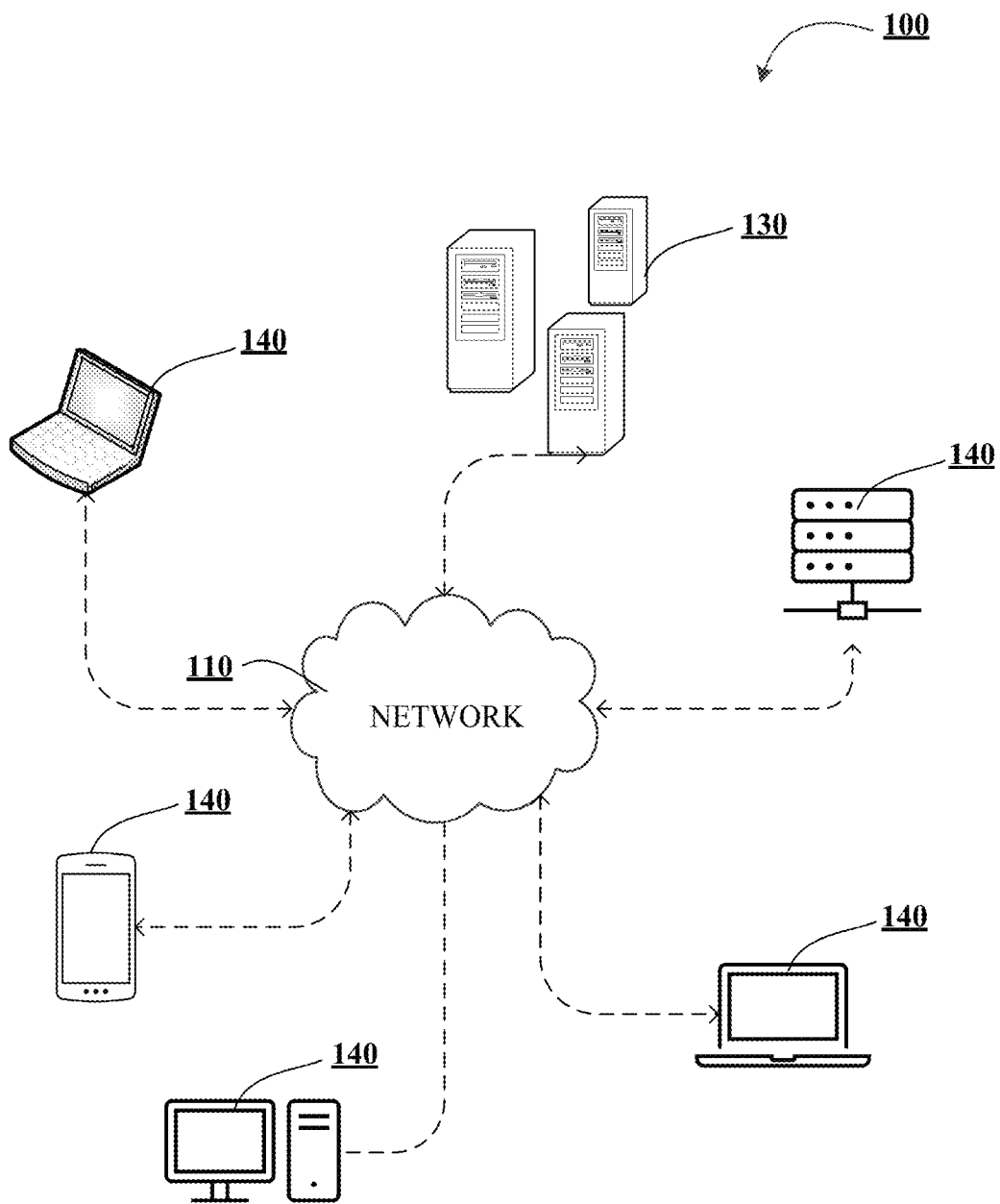
Figure 1B:
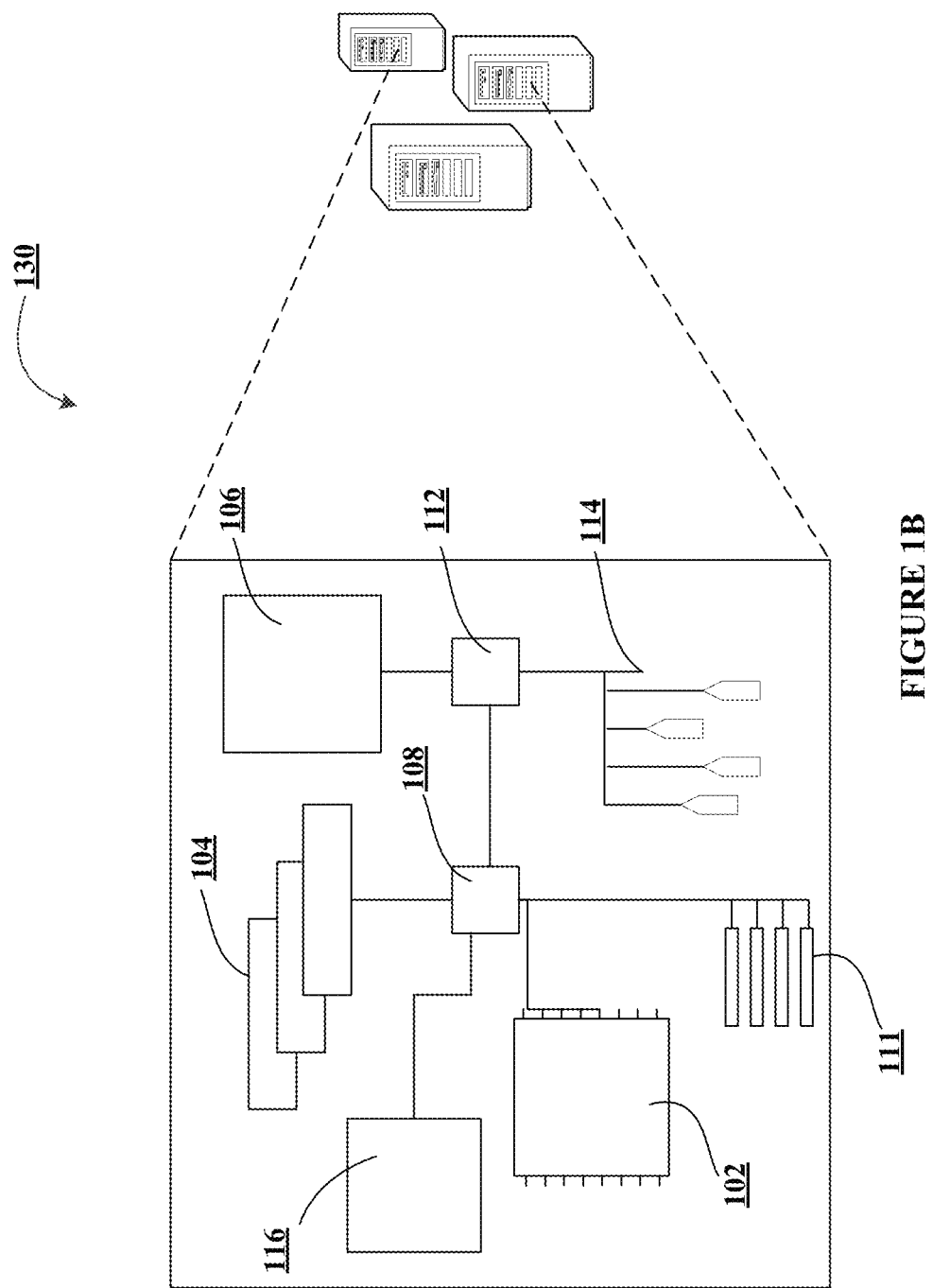
Figure 1C:
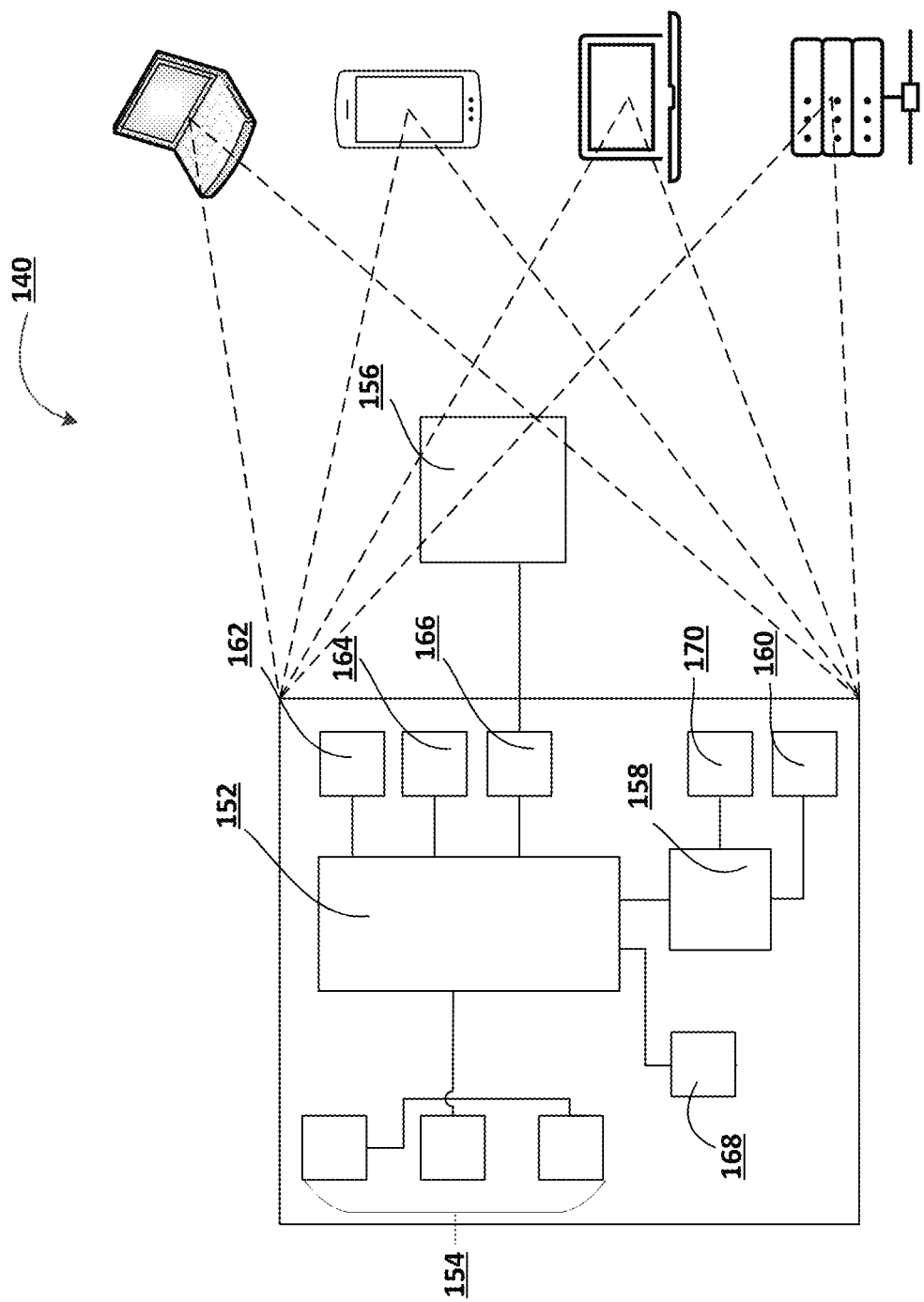
Figure 2:
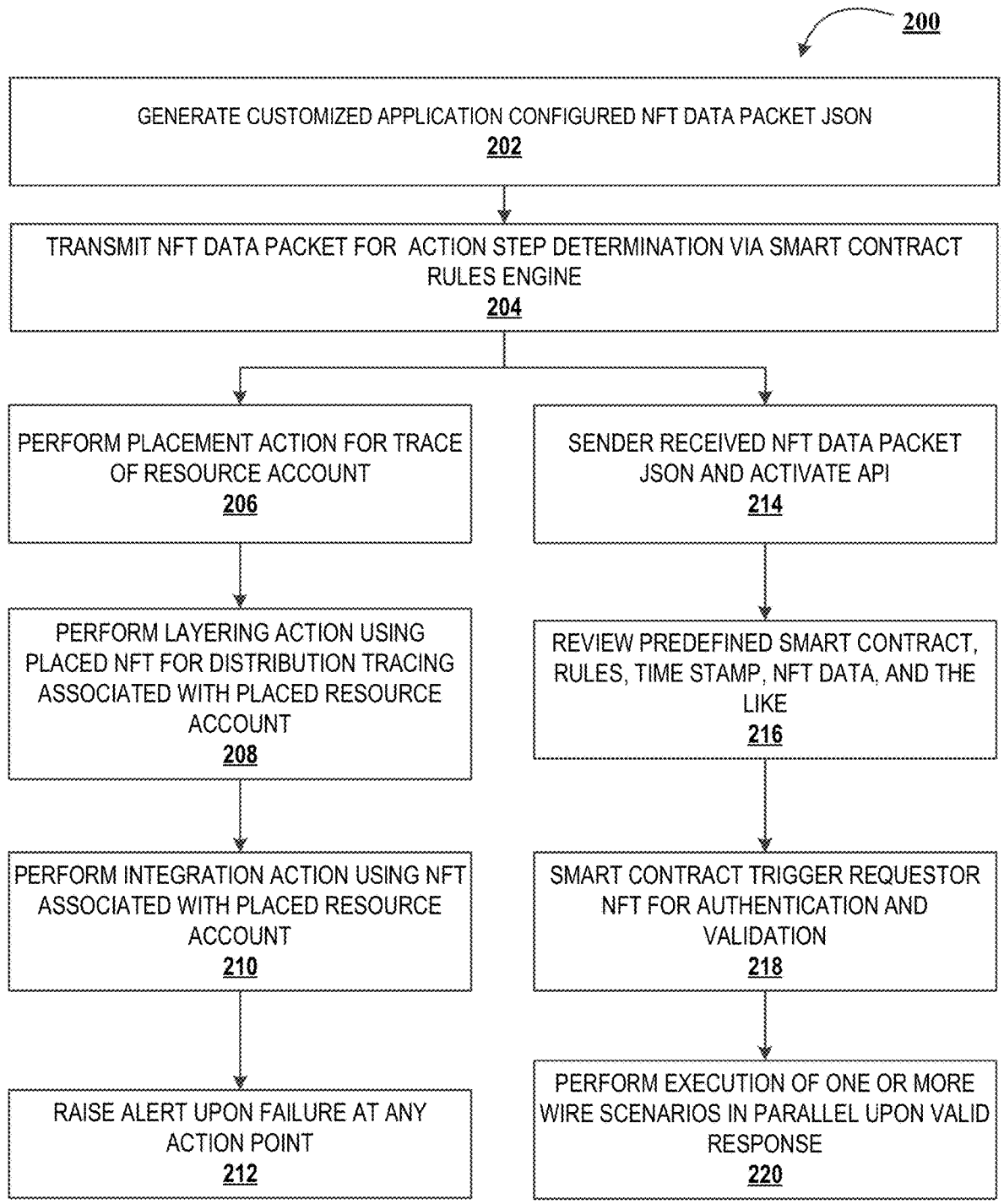
Figure 4A:
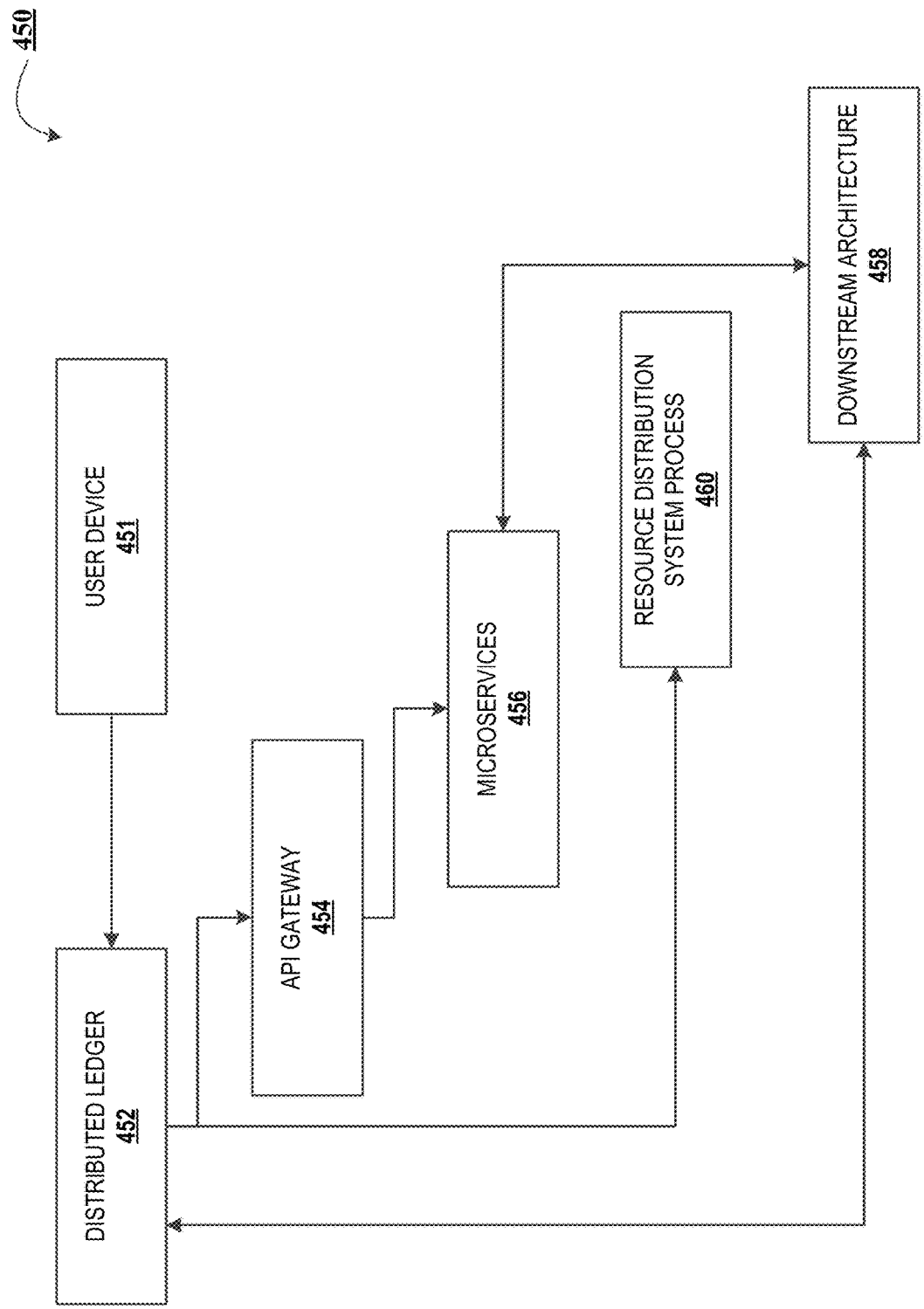
Figure 4B:
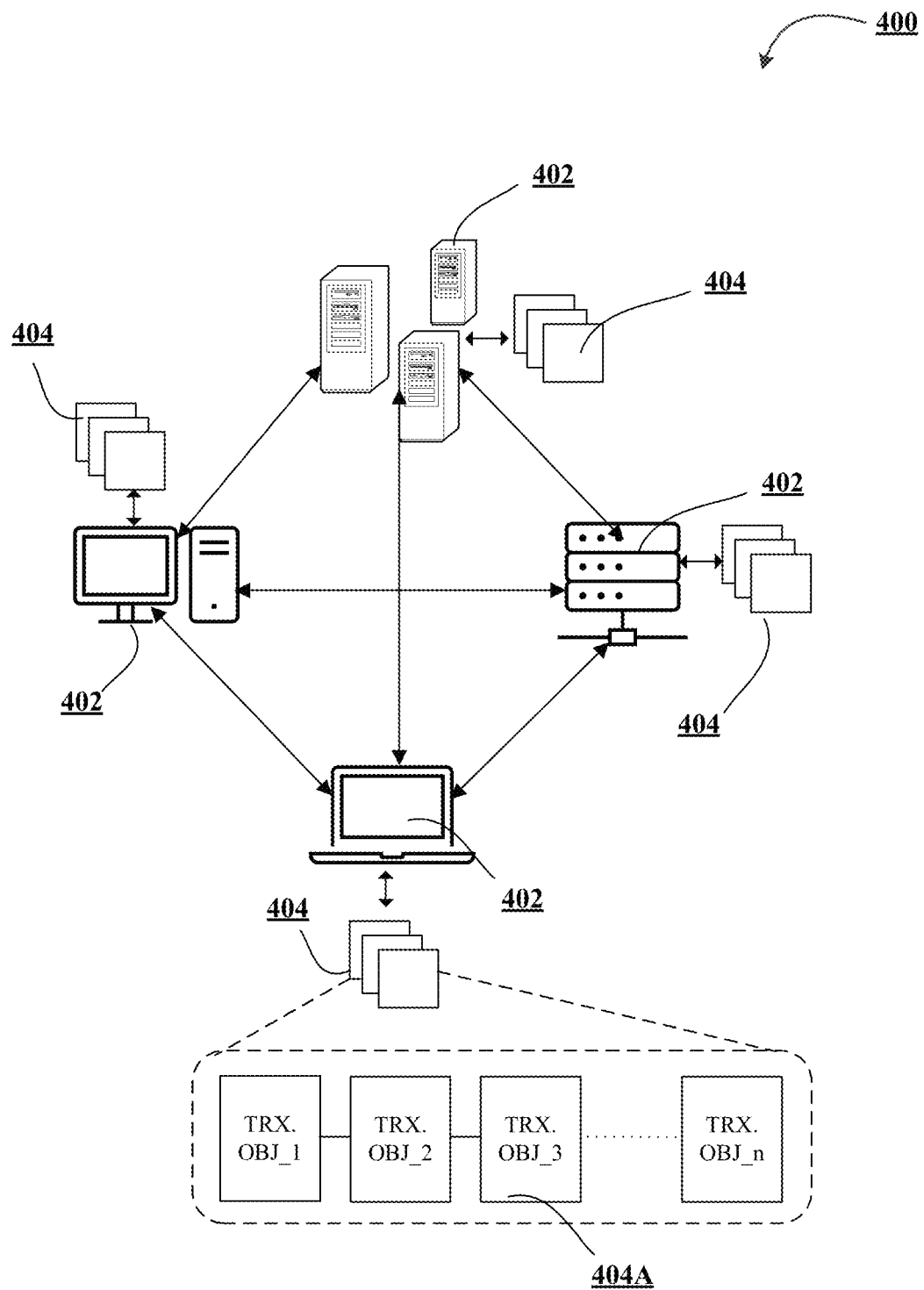
Figure 4C:
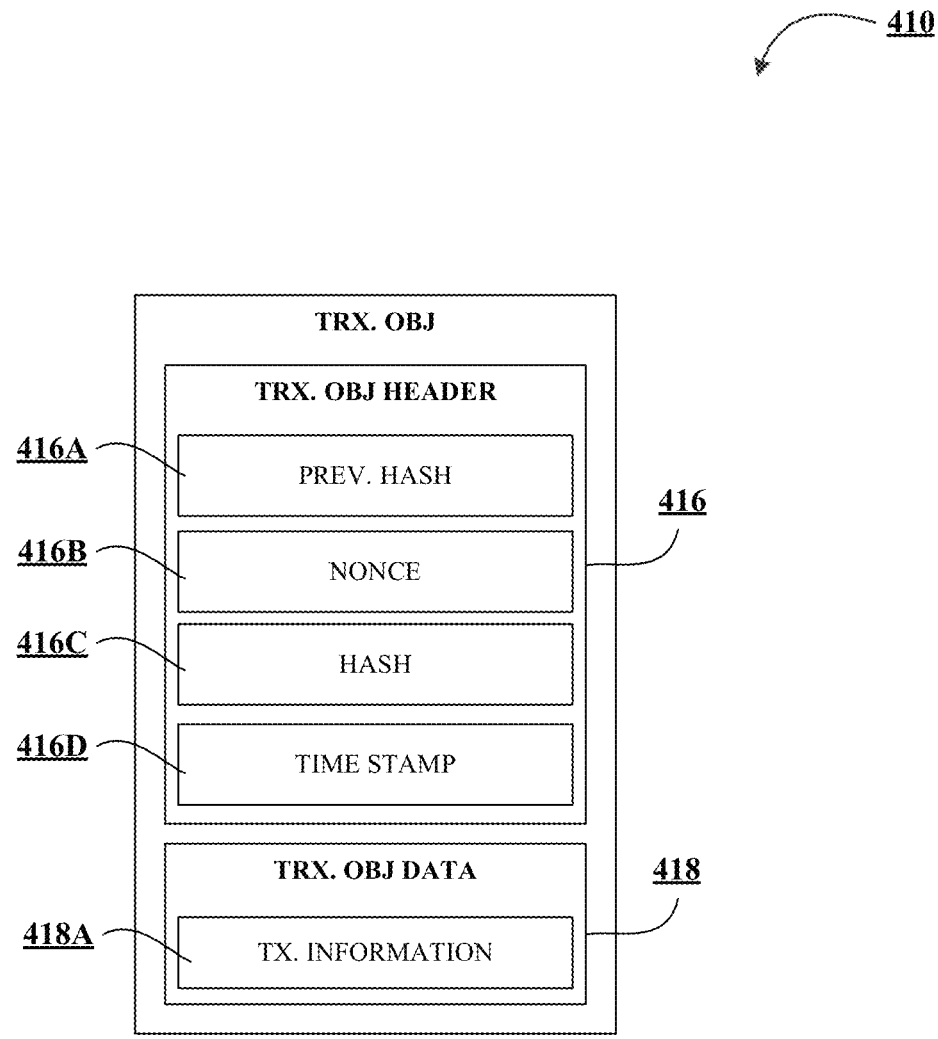

Having thus described embodiments of the invention in general terms, reference will now be made the accompanying drawings, wherein:

FIGS. 1A-1C illustrates technical components of an exemplary distributed computing environment for a decentralized platform application programing interface protocol for secure resource transmissions, in accordance with an embodiment of the invention;

FIG. 2 illustrates a process flow for the decentralized platform application programming interface protocol, in accordance with an embodiment of the invention;

FIG. 3 illustrates a swim flow illustrating system interactions in the decentralized platform application programming interface protocol process, in accordance with an embodiment of the invention; and FIGS. 4A-4C illustrate an exemplary distributed ledger technology (DLT) architecture associated with the decentralized platform application programming interface protocol process, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

Today, resource transmissions across geographic locations, such as a wire transfer, digital transfer, or the like, typically requires several steps to initiate, including providing information for both the user and the recipient, including but not limited to account numbers, address, routing numbers, swift code, or the like. A single error in the inputs will trigger a misappropriation of the transmission, which could include a delay of the resource transmission, denial of resource transmission, or misplacement of resource transmission especially across international secure resource transmissions.

Embodiments of the invention are directed to systems, methods, and computer program products for a decentralized platform application programming interface protocol for secure resource transmissions. The invention provides a decentralized platform application programming interface protocol for secure resource transmission and tracing. The system may utilize a secure user device to request resource transmissions and resource tracing.

The user device identifies an authentication feature associated with the user upon receiving a request from a requestor for a resource transmission from a sender. This authentication feature along with a time stamp, user device geolocation, static user device identification, and resource account information will be complied into a data JSON packet and embedded into a code configured non-fungible token (NFT). The NFT is then transmitted to the sender with a prompt command to open an encrypted URL associated with the NFT.

Upon accessing the encrypted URL, the system triggers the sender to a decentralized platform application programming interface, such as a decentralized finance open banking application programming interface. Furthermore, upon opening at the sender user device, the data packet may be redirected to the requestor's financial institution for authentication and authorization of the request to match the record of the data packet parameters.

In conjunction, the sender financial institution confirms account information and approves the secure resource transmission.

What is more, the present invention provides a technical solution to a technical problem. As described herein, the technical problem includes processing of secure resource transmissions across institutions with a wholistic tracking ability to prevent misappropriation of transfers and digital data misappropriation with respect to transmission of data. The technical solution presented herein allows for expedited secure resource transmissions using an NFT with distributed network tracking capabilities for continued tracking and monitoring of secure resource transmissions. Furthermore, generation of and communicably linking financial institutions using the decentralized platform application programming interface allows for real-time traceable secure resource transmissions. In particular, the decentralized platform application programming interface protocol for secure resource transmissions is an improvement over existing solutions, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for a decentralized platform application programming interface protocol for secure resource transmission 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like. Furthermore, end point devices may be user devices or internet of things devices such as glasses.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for the decentralized platform application programming interface protocol 200, in accordance with an embodiment of the invention. As illustrated in block 202, the process 200 is initiated by generating a customized application configured NFT data packet JSON. In some embodiments, a user may be requesting a secure resource transmission from a sender. In some embodiments, a user may be requesting a trace of a resource account for misappropriation identification. For initiation of the process 200, the user or requestor may authenticate using a user device, such as an internet enabled device such as glasses or the like. The customized application configured NFT data packet JSON may be generated based on an iris image, a geolocation, a time stamp, user device virtual identification, requestor financial institution information associated with the virtual identification, and information about the sender and the resource distribution requested. The user device authentication feature along with the time stamp, user device geolocation, static user device identification, and resource account information will be complied into a data JSON packet and embedded into a code configured NFT.

Next, as illustrated in block 204, the process 200 continues by transmitting the NFT data packet for action step determination via smart contract rules engine. In this way, the action step may be determined based on the user request. In some embodiments, the action step may be a request for a secure resource transmission, such as a wire transfer, digital payment, check payment, or the like. In some embodiments, the action step may be a request for resource account tracing, in which the user or authority agent may trace digital resource distributions occurring on a resource account. The smart contract rules engine further provides predefined triggers for each action step.

The NFT is then transmitted to the sender with a prompt command to open an encrypted URL associated with the NFT. Upon accessing the encrypted URL, the system triggers the sender to a decentralized platform application programming interface, such as a decentralized finance open banking application programming interface. Furthermore, upon opening at the sender user device, the data packet may be redirected to the requestor's financial institution for authentication and authorization of the request to match the record of the data packet parameters. In conjunction, the sender financial institution confirms account information and approves the secure resource transmission.

In some embodiments, the system triggers an action step for a request for a secure resource transmission. The decentralized platform, such as a De-Fi platform may received information from the smart contract to trigger requestor NFT for authentication and validation of the data packet. Furthermore, the smart contract may trigger the sender's financial institution to confirm and honor the resource distribution and confirm the status of the sender's account for secure resource transmission.

As illustrated in block 214, the system triggers the action step for a request for a secure resource transmission. As illustrated in block 214, the process 200 continues by the sender the received NFT data packet JSON and activating the AIP. The sender may receive the NFT data packet and access a URL associated with the data packet. The access of the URL triggers the code deployment on the data packet to activate the AIP. As illustrated in block 216 the system allows sender and requester review of the predefined smart contract, rules, time stamp, NFT data, and the like to confirm authentication. In some embodiments, the issuing financial institution for the requestor may review the NFT data packet. In some embodiments, the issuing financial institution of the sender may review the NFT data packet.

As illustrated in block 218, the smart contract triggers the requestor NFT for authentication and validation. If there is an invalid response, the smart contract triggers invalidity of the data packets for time stamp basis or invalid or no response from the requestor financial institution. The system, upon invalid response receipt, the system ends the secure resource transfer. However, if a valid response from the smart contract trigger of the requestor NFT for authentication and validation, the smart contract then triggers sender's financial institution to honor the secure resource distribution and confirm the status.

Finally, as illustrated in block 220, the process of secure resource transmission is completed by performing an execution of one or more wire scenarios in parallel upon valid response. As such the smart contract triggers the notification to both the sender and the requestor of the successful transaction completion.

In some embodiments, the action step may be a request for resource account tracing, in which the user or authority agent may trace digital resource distributions occurring on a resource account. The smart contract rules engine further provides predefined triggers for each action step.

In today's world its highly impossible to trace the origin of the resource distributions such as resource transaction across the global to prevent misappropriation. The currency transaction patterns of an entity or user is identified to identify inconsistency outside of normal activities. This may include a volume of cashier's checks, money orders, and/or wire transfers deposited into or purchased through an account when the nature of the account holder's normal activity would not appear to justify such activity.

The system generates a dynamically configured custom NFT for every transaction from an account and tag the same within a distributed ledger. The NFT would be irreversible and will track the transaction throughout the lifetime of the resource distribution. The system uses the decentralized platform application programming interface protocol techniques to crawl through the resource distributions to identify resource transactions associated with misappropriation steps.

As illustrated in block 206, the process 200 for tracing of digital resource distributions is initiated by performing placement action for tracing of the resource account. In this way, the system may be able to track resource account transactions. In this way, the requestor NFT data packet JSON will be placed within an account. The NFT data packet JSON may comprise code included for a decentralized platform application programming interface protocol, a virtual or token identification, a time stamp, and a geolocation coordinates. Furthermore, the system may track digital resource transfers from the resource account and tracking the digital resources during the lifetime of the resource. In this way, the system may create an NFT and tag the particular account to trace and track transactions occurring from the account. The system dynamically generates the custom NFT built using distributed ledger technology that will track resource distributions at all times and track patterns in the resource account transaction processing. The system triggers a kick start to an alerting mechanism on a decentralized platform.

As illustrated in block 208, the process 200 continues by performing layering action using placed NFT for distribution tracing associated with placed resource accounts. In this way, once placement state occurs, the system is able to perform a layering stage to build a distributed ledger of all transactions at a time associated with the NFT tagged resource account and build a pattern of resource distributions associated with the resource distribution account.

As illustrated in block 210, the system may perform integration action using NFT associated with placed resource accounts. In this way, the system may trace and get data of the NFT transactions related to the tagged resource distribution account. As illustrated in block 212, the system may raise alert upon failure at any action point. The alert may be generated based on an identification of a transaction or resource distribution that is out of pattern for the resource account. The system may flag the transaction and the system may trace the transaction, flag the transaction, or issue a stop payment on the digital transaction.

FIG. 3 illustrates a swim flow illustrating system interactions in the decentralized platform application programming interface protocol process 300, in accordance with an embodiment of the invention. As illustrated, there is a requesting device 302 associated with the requestor, which may be a user device such as a mobile device or wearable device including glasses or the like. The requestor issuing institution 304 is an institution, such as a financial institution that is a custodian of a resource distribution account associated with the requestor, this may be a financial account associated with or maintaining a requestor account. As illustrated a sending device 306 and a sender issuing institution 308 are also displayed. The sending device 306 may be a user device such as a mobile device or wearable device including glasses or the like. sender issuing institution 308 is an institution, such as a financial institution that is a custodian of a resource distribution account associated with the sender, this may be a financial account associated with or maintaining a sender account. Furthermore, a system 301 is illustrated. The system may be interconnected by system applications or communication linkages with the other devices including the requesting device 302, requestor issuing institution 304, sending device 306, and sender issuing institution 308.

As illustrated in block 310, the process 300 is initiated by the requesting device performs an authentication action. The authentication action may be a scan of the user, an input of a user password, or the like. Upon authentication, the system application is displayed to the requestor on the requesting device 302. The requestor may perform a request that requests a sender to security transmit resources from the sender to the requestor. This request may be similar to a wire transfer, digital resource transfer, or the like. Upon providing information such as the sender, an amount, an account associated with the requestor, and the like, the system 301 may take that information and security information and generate a customized application configured NFT as illustrated in block 312. This NFT may be a JSON with code including the information, a URL, security information such as requesting device identification, geolocation, and the like as discussed above. The system 301 provides the requesting device 302 with an encrypted NFT data packet as illustrated in bock 314. As illustrated in block 316, the system allows for transmission of dynamic message with a URL link for action to the sending device 306 associated with the sender.

The sender may receive the dynamic message with the link from the requesting device for action, as illustrated in block 318. The dynamic message includes the NFT data packet and the URL for user selection. Upon sender selection of the URL the NFT data packet may transmit to the requestor issuing institution 304 to match records based on requestor data packet within the NFT, as illustrated in block 320. As illustrated in block 322, the render issuing institution 308 may receive the requestor account information and the sender authentication upon requestor issuing institution validation. The sender issuing institution 308 may confirm the resources in the sender account and transmit the confirmation, as illustrated in block 324. At this confirmation point, the sending device 306 receives confirmation 328, and the requestor issuing institution receives the resource transmission 326 which are both triggered by the system confirmation. The system 301 then allows for transmission of a display of a success message 330 at the requesting device 302 to present to the requestor confirmation of the resource distribution. Throughout the process, the system 301 monitors the NFT on a distributed leger and allows for authentication and validation across the process, as illustrated in block 313.

FIG. 4A illustrates an exemplary DLT architecture associated with the decentralized platform application programming interface protocol process 450. As illustrated in block 452, the distributed ledger is in communication with the user device 451. The distributed ledger allows for authentication using the user device, checks the NFT for authentication, performs user device authentication normalization and validation and stores user details pre and post resource distribution. The distributed ledger is further illustrated below in Figurers 4B-4C.

FIGS. 4B-4C illustrate an exemplary DLT architecture, in accordance with an embodiment of the invention. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (say 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 4B, the exemplary DLT architecture 400 includes a distributed ledger 404 being maintained on multiple devices (nodes) 402 that are authorized to keep track of the distributed ledger 404. For example, these nodes 402 may be computing devices such as system 130 and client device(s) 140. One node 402 in the DLT architecture 400 may have a complete or partial copy of the entire distributed ledger 404 or set of transactions and/or transaction objects 404A on the distributed ledger 404. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 4C, the exemplary DLT architecture 410 includes an exemplary transaction object 414A may include a transaction header 416 and a transaction object data 418. The transaction header 416 may include a cryptographic hash of the previous transaction object 416A, a nonce 416B—a randomly generated 32-bit whole number when the transaction object is created, cryptographic hash of the current transaction object 416C wedded to the nonce 416B, and a time stamp 416D. The transaction object data 418 may include transaction information 418A being recorded. Once the transaction object 414A is generated, the transaction information 418A is considered signed and forever tied to its nonce 416B and hash 416C. Once generated, the transaction object 414A is then deployed on the distributed ledger 414. At this time, a distributed ledger address is generated for the transaction object 414A, i.e., an indication of where it is located on the distributed ledger 414 and captured for recording purposes. Once deployed, the transaction information 418A is considered recorded in the distributed ledger 414.

Referring back to FIG. 4A, the distributed ledger is linked to the API gateway 454, the resource distribution system process 460, and downstream architectures 458. The API gateway 454 links to the microservices hub 456. The microservices hub 456 comprises an authentication hub, mobile number validation microservice, request microservice, a fund availability microservice, a denomination check microservice, a push notification microservice, a dynamic code generator microservice, and a cash microservice. These microservices work with the system to perform checks and confirm authorizations between requestors and senders. The microsystems further link to the downstream architecture 458 which include customer search engines, account balance platforms, electronic data recorder, and a web engine. The resource distribution system process 460 is linked to the distributed ledger 452 and the other services in order to perform the functions described in detail above.

Embodiments of the invention are directed to systems, methods, and computer program products for a decentralized platform application programming interface protocol for secure resource transmissions. The invention provides a decentralized platform application programming interface protocol for secure resource transmission and tracing. The invention provides an authentication feature complied into a data JSON packet and embedded into a code configured non-fungible token (NFT) that is then transmitted to a user with a prompt command to open an encrypted URL associated with the NFT. Upon accessing the encrypted URL, the system triggers the sender to a decentralized platform application programming interface allowing for communication across the decentralized platform application programming interface to validate the data packets between each other for authentication and authorization. The system further stores the NFT generation and deployment on a distributed ledger. In this way, storing and tracking the movement of resources using a distributed ledger.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for decentralizing a platform application programming interface protocol, the system comprising:
    a processing device;
    a non-transitory storage device containing computer program code comprising computer instructions that, when executed, cause the processing device to:
        receive an authentication action triggered from a requesting device;
        compile a requesting action, an authentication feature of a requestor, and resource data, wherein the requesting action is tracking resource distributions from a resource distribution account;
        create a JavaScript Object Notation (JSON) data packet comprising the requesting action, the authentication feature, the resource data, and an encrypted uniform resource locator (URL) and embedding a smart contract comprising smart contract directions for tracing a digital resource account by building (i) a distributed ledger of all transactions associated with an NFT tagged resource account and (ii) a pattern of resource distributions associated with the digital resource account;
        embed the JSON data packet into a configured non-fungible token (NFT);
        transmit the configured NFT;
        generate, upon encrypted URL access, a linkage to a decentralized platform application programming interface; and
        perform an action for digital resource account tracing by executing the smart contract to build (i) the distributed ledger of all transactions associated with the NFT tagged resource account and (ii) the pattern of resource distributions associated with the digital resource account.

2. The system of claim 1, wherein the authentication feature further comprises a physical feature of the requestor captured by the requesting device.

3. The system of claim 1, wherein the decentralized platform application programming interface performs secure communication between financial institutions to transmit data across the decentralized platform application programming interface without requiring additional user authentication at one or more separate financial institutions.

4. The system of claim 1, further comprising a distributed ledger storing the configured NFT.

5. The system of claim 2, wherein the requesting device further comprises internet enabled glasses configured to capture the authentication feature.

6. A computer program product for decentralizing a platform application programming interface protocol with at least one non-transitory computer-readable medium having computer-readable program code portions embodied therein, the computer-readable program code portions comprising:
    an executable portion configured for receiving an authentication action triggered from a requesting device;
    an executable portion configured for compiling a requesting action, an authentication feature of a requestor, and resource data, wherein the requesting action is tracking resource distributions from a resource distribution account;
    an executable portion configured for creating a JavaScript Object Notation (JSON) data packet comprising the requesting action, the authentication feature, the resource data, and an encrypted uniform resource locator (URL) and embedding a smart contract comprising smart contract directions for tracing a digital resource account by building (i) a distributed ledger of all transactions associated with an NFT tagged resource account and (ii) a pattern of resource distributions associated with the digital resource account;
    an executable portion configured for embedding the JSON data packet into a configured non-fungible token (NFT);
    an executable portion configured for transmitting the configured NFT;
    an executable portion configured for generating, upon encrypted URL access, a linkage to a decentralized platform application programming interface; and
    an executable portion configured for performing action for account tracing by executing the smart contract to build (i) the distributed ledger of all transactions associated with the NFT tagged resource account and (ii) the pattern of resource distributions associated with the digital resource account.

7. The computer program product of claim 6, wherein the authentication feature further comprises a physical feature of the requestor captured by the requesting device.

8. The computer program product of claim 6, wherein the decentralized platform application programming interface performs secure communication between financial institutions to transmit data across the decentralized platform application programming interface without requiring additional user authentication at one or more separate financial institutions.

9. A computer-implemented method for decentralizing a platform application programming interface protocol, the method comprising:
    providing a computing system comprising a computer processing device and a non-transitory computer readable medium, where the computer readable medium comprises configured computer program instruction code, such that when said instruction code is operated by said computer processing device, said computer processing device performs the following operations:
        receiving an authentication action triggered from a requesting device;
        compiling a requesting action, an authentication feature of a requestor, and resource data, wherein the requesting action is tracking resource distributions from a resource distribution account;

creating a JavaScript Object Notation (JSON) data packet comprising the requesting action, the authentication feature, the resource data, and an encrypted uniform resource locator (URL) and embedding a smart contract comprising smart contract directions for tracing a digital resource account by building (i) a distributed ledger of all transactions associated with an NFT tagged resource account and (ii) a pattern of resource distributions associated with the digital resource account;

embedding the JSON data packet into a configured non-fungible token (NFT);

transmitting the configured NFT;

generating, upon encrypted URL access, a linkage to a decentralized platform application programming interface; and performing an action for digital resource account tracing by executing the smart contract embedded to build (i) the distributed ledger of all transactions associated with the NFT tagged resource account and (ii) the pattern of resource distributions associated with the digital resource account.

10. The computer program product of claim 6, wherein, further comprising an executable portion for storing the configured NFT on a distributed ledger.

11. The computer program product of claim 7, wherein the requesting device further comprises internet enabled glasses configured to capture the authentication feature.

12. The computer-implemented method of claim 9, wherein the authentication feature further comprises a physical feature of the requestor captured by the requesting device.

13. The computer-implemented method of claim 9, wherein the decentralized platform application programming interface performs secure communication between financial institutions to transmit data across the decentralized platform application programming interface without requiring additional user authentication at one or more separate financial institutions.

14. The computer-implemented method of claim 9, wherein, further comprising an executable portion for storing the configured NFT on a distributed ledger.

15. The computer program product of claim 13, wherein the requesting device further comprises internet enabled glasses configured to capture the authentication feature.

* * * * *